United States Patent Office 3,144,416
Patented Aug. 11, 1964

3,144,416
METHOD OF MANUFACTURING SILVER CATALYSTS TO BE USED FOR VAPOR PHASE DIRECT OXIDATION OF OLEFINS
Kirokuro Hosoda, Yokohama, Hideo Kinoshita, Tokyo, Katsuyoshi Hirasa, Yokohama, Isamu Namiki, Tokyo, Isamu Noguchi, Ota-ku, Tokyo, and Toshiharu Hirayama, Tokyo, Japan, assignors to Furukawa Electric Company Limited, Tokyo, Japan
No Drawing. Filed Feb. 4, 1960, Ser. No. 6,591
Claims priority, application Japan Feb. 17, 1959
4 Claims. (Cl. 252—476)

This invention relates to methods of manufacturing silver catalysts to be used for the vapor phase direct oxidation of olefins. The invention is characterized in that powders of active catalytic silver are dispersed in and diluted by powders of electrolytic silver and the mixture is molded into granular form adapted to be used as a catalyst for the vapor phase direct oxidation of olefins for the production of olefin oxides.

The principal object of this invention is to provide a method for the production of silver catalysts which are excellent both in selectivity and conversion and enable easy distribution and dissipation of the heat of reaction which is generated in the vapor phase direct oxidation of olefins with air or other oxygen containing gases.

Another object of this invention is to produce olefin oxides efficiently on a commercial scale and at a lower cost by using the silver catalyst manufactured by this invention.

In the vapor phase direct oxidation of ethylene, there occurs a partial oxidation for producing ethylene oxide evolving comparatively less heat as well as a combustion reaction producing carbon dioxide and water and generating a large amount of heat simultaneously and the heat of reaction tends to be accumulated thereby, causing a local overheating of catalyst and promoting the combustion reaction so that the yield of ethylene oxide is not only considerably reduced but also is accompanied by danger of explosion. Accordingly, it is extremely important to disperse and dissipate the heat of reaction.

In order to avoid such local overheating of catalyst layers, it has been proposed to use, as the catalyst, foils, wires or gauzes of silver having their surfaces activated by silver nitrate and having a good thermal conductivity (Japanese Patent No. 170,795) and also to insert as heat absorbing elements, wires or rods of copper or silver together with catalysts into the reaction zone (United States Patent No. 2,491,057) and also use of active catalytic silver adhered to a base plate of silver or aluminum has been proposed in British Patent No. 728,821. However, the catalyst which is made of silver wires, silver gauzes or silver scraps treated with a dilute nitric acid to etch their surfaces and which is then dipped into a solution of silver nitrate and afterwards heated, has not sufficient activity owing to the small quantity of active catalytic silver present. The latter catalyst has a narrow contact surface between active catalytic silver and the heat absorbing elements so that it can not sufficiently prevent the local overheating of the catalysts.

The present invention is based on the principle of increasing the contact surface and the thermal conductivity of powders of active catalytic silver to dissipate the heat of reaction quickly and prevent local overheating of the catalyst. For this purpose, powders of active catalytic silver are diluted by dispersing them in powders of electrolytic silver which provide a sufficiently large contact surface and have the ability of preventing local overheating of the catalyst by distributing and dissipating the heat of reaction quickly and consequently suppressing the combustion reaction and increasing selectivity and facilitating control of the reaction temperature.

According to a preferred method of preparing the catalyst of this invention, a suitable volatile liquid such as acetone is added to a mixture of powders of active catalytic silver prepared by a conventional method and electrolytic silver powders, and the slurry thus obtained being uniformly mixed. After the evaporation of the liquid, the mixture is compressed and molded to form porous granular catalysts.

The "active catalytic silver powder" in this specification means the silver powder produced by pyrolysis of silver nitrate, silver carbonate, silver formate, silver acetate, silver oxalate, silver lactate and other silver salts and by reducing silver oxide and the said salts with formaldehyde, saccharides and other reducing reagents.

The "electrolytic silver powder" in this specification means the silver powder which does not show activity in the catalytic oxidation of ethylene and this powder has a dendritic structure and is that substance deposited on a cathode when a solution of silver nitrate is subjected to electrolysis.

The proportion of the powder of active catalytic silver in the mixture with the powder of electrolytic silver may vary within a wide range of 10 to 50% by weight. Except at the upper and lower extremities of the above range of the active catalytic silver content, splendid selectivity and activity can be obtained substantially all over this range. The relation between the content of active catalytic silver in the catalysts and the catalytic ability in the reaction of producing ethylene oxide is as shown in the following Table I. The catalysts used in this table were made of powders of active catalytic silver prepared according to the method as described in Example I mixed with powders of electrolytic silver of $-100+200$ mesh (silver powders of dendritic structure deposited on a cathode in the electrolysis of a solution of silver nitrate) dispersed and diluted and molded as described above and the reaction was effected under a pressure of 1 atmosphere.

TABLE I

Effect of Active Catalytic Silver Content

| Active catalytic Ag content, Wt. percent | Reaction temp., °C. | Space velocity, l./hr. | Selectivity, percent | Conversion, percent | Yield, percent |
|---|---|---|---|---|---|
| 10 | 230 | 1130 | 63.2 | 60.9 | 38.5 |
| 10 | 250 | 1130 | 69.2 | 63.4 | 43.7 |
| 20 | 230 | 1040 | 71.6 | 45.9 | 32.5 |
| 25 | 250 | 1030 | 70.5 | 46.5 | 33.0 |
| 25 | 270 | 1040 | 60.4 | 70.0 | 42.4 |
| 30 | 230 | 1050 | 74.0 | 52.2 | 38.0 |
| 30 | 270 | 1040 | 62.0 | 76.0 | 47.0 |
| 35 | 230 | 1040 | 69.4 | 31.6 | 21.9 |
| 35 | 250 | 1050 | 70.8 | 59.2 | 42.0 |
| 35 | 270 | 1050 | 64.5 | 64.3 | 41.4 |
| 50 | 230 | 1040 | 69.1 | 70.1 | 47.8 |
| 50 | 250 | 1040 | 66.7 | 79.6 | 53.1 |
| 50 | 270 | 1050 | 56.1 | 94.6 | 54.4 |
| 100 | 210 | 1100 | 41.8 | 27.6 | 11.5 |

Note.—(1) The content of ethylene in the reaction gas was about 4% by volume. (2) The selectivity, conversion and yield can be expressed by the following formulae:

$$\text{Selectivity (Percent)} = \frac{\text{Moles of ethylene converted to ethylene oxide}}{\text{Moles of converted ethylene}} \times 100$$

$$\text{Conversion (Percent)} = \frac{\text{Moles of converted ethylene}}{\text{Moles of ethylene in the reaction gas}} \times 100$$

$$\text{Yield (percent)} = \frac{\text{Moles of ethylene converted to ethylene oxide}}{\text{Moles of converted ethylene}} \times 100$$

The relation between space velocity and activity of catalyst in reactions producing ethylene oxide by using the catalyst of this invention is shown in Table II, wherein the catalyst containing active catalytic silver of 25% by weight consists of a mixture of 25 parts by weight of powder of active catalytic silver prepared according to the process as shown in Example I and of 75 parts by weight of powder of electrolytic silver of −50+100 mesh, and the catalyst containing 50% by weight of active catalytic silver consists of 50 parts by weight of powder of active catalytic silver and 50 parts by weight of electrolytic silver of −100+200 mesh, and the former powder is dispersed in the latter and press-molded as above described. The reaction was carried out under 1 atmosphere.

TABLE II

*Effect of Space Velocity*

| Active catalytic Ag content, Wt. percent | Reaction temp., °C. | Space velocity, l/hr. | Selectivity, percent | Conversion, percent | Yield, percent |
|---|---|---|---|---|---|
| 25 | 250 | 320 | 60.8 | 91.0 | 55.4 |
| 25 | 250 | 1,030 | 67.5 | 60.5 | 40.8 |
| 25 | 250 | 1,860 | 66.9 | 42.6 | 28.5 |
| 25 | 250 | 2,360 | 61.4 | 43.9 | 27.0 |
| 50 | 250 | 380 | 63.5 | 92.6 | 58.9 |
| 50 | 250 | 1,040 | 66.7 | 79.6 | 53.1 |
| 50 | 250 | 1,850 | 70.1 | 52.1 | 36.6 |
| 50 | 250 | 2,300 | 73.4 | 43.8 | 32.2 |

As apparent from Table II, the catalyst of this invention facilitates dispersion and dissipation of heat of reaction so that, notwithstanding that the space velocity of reaction is increased, that is, the heat of reaction evolved in a unit time is increased, selectivity does not substantially change, but in some cases even increases.

As promoters for the direct oxidation of ethylene, Cs, Cu, Au, Be, Ba, Zn, Al, La, Ce, Sm, Zr, Th, and Sn for example or their oxides can be added to the powders of active catalytic silver.

Similarly in order to augment selectivity of the catalyst for the direct production of ethylene oxide, a small quantity of halogen compound, sulfur compound, nitrogen compound, or phosphorous compound may be added to the reaction gas or catalyst.

When the present invention is applied to the direct oxidation of ethylene, it can be carried out within the range of reaction temperatures of from 150 to 400° C. and under high pressure, atmospheric pressure or reduced pressure.

Examples of this invention will be described in the following:

EXAMPLE I 474 parts of silver nitrate were dissolved in 6,000 parts of distilled water and while the solution was cooled below 10° C. with ice, a solution consisting of the same quantity of water and 730 parts of caustic potash was added drop by drop to the former. After the precipitation of silver oxide had been completed, 250 parts of 30% formalin solution were added drop by drop. After the solution was left for 30 minutes it was boiled for one hour while stirring violently and then the solution was filtered by suction. After washing with water, the precipitate was treated with 1500 parts of 2% nitric acid for 2 to 3 minutes and then the solution was filtered by suction, and after washing well with water until there was no residual nitrate ion, it was dried at about 80° C.

A mixture of 25 parts by weight of the powders of active catalytic silver thus prepared and 75 parts by weight of powder of electrolytic silver of −50+100 mesh was added to acetone to form a slurry. After the acetone was evaporated off, the mass remaining was molded under pressure to form porous granular catalyst.

Using the catalyst thus prepared, a reaction gas containing 4% by volume of ethylene and 96% by volume of air was reacted under a reaction pressure of 1 atmosphere, at a reaction temperature of 230° C. and a space velocity of 1,000 (flow rate of reaction gas in (lit./hr.) quantity of catalyst (lit.)), and a selectivity of 73.0% and conversion of 47.4% were obtained.

When the above reaction was carried out using the same catalyst at a reaction temperature of 250° C. and space velocity of 500, a selectivity of 60.8% and conversion of 91.0% were obtained.

EXAMPLE II

Using a catalyst prepared in the same manner as described in Example I, a reaction gas containing 3% by volume of ethylene and 97% by volume of air was reacted under a reaction pressure of 10 atmospheres, a reaction temperature of 210° C. and a space velocity of 4,400, and a selectivity of 81% and conversion of 37% were obtained.

When the reaction was carried out using the same catalyst at a reaction temperature of 250° C., a selectivity of 67% and conversion of 70% were obtained.

Further, a reaction carried out using the same catalyst at a reaction temperature of 230° C. and space velocity of 6,600, while all the other reaction conditions were same as above stated, resulted in a selectivity of 70% and conversion of 45%, were obtained.

EXAMPLE III

Using a granular catalyst which was prepared by diluting and dispersing 10 parts by weight of the powder of active catalytic silver prepared as described in Example I, 90 parts by weight of powder of electrolytic silver of −50+100 mesh and by molding the same into granules, a reaction gas containing 4% by volume of ethylene and 96% by volume of air was reacted under the pressure of 1 atmosphere, temperature of 270° C. and space velocity of 1,000, and a selectivity of 66.4% and conversion of 71.0% were obtained.

EXAMPLE IV 25 parts by weight of active catalytic silver powder, prepared by charging into a quartz tube silver oxalate and decomposing by heating at about 130° C. in a hydrogen current, were dispersed in and diluted by 75 parts by weight of unscreened electrolytic silver powder and molded as described in Example I. Using the catalyst thus prepared a reaction gas containing 5% by volume of ethylene and 95% by volume of air was reacted under 1 atmospheric pressure, at a reaction temperature of 230° C. and space velocity of 970, and a selectivity of 71% and conversion of 42.5% were obtained.

As may be clearly seen from the foregoing description, the catalyst covered by the invention consists of active catalytic silver powder diluted and dispersed in electrolytic silver powder and molded into porous particles. This has the advantage of ensuring very easy dispersion and dissipation of the heat of reaction which occurs in the production of olefin oxide by the vapor phase direct oxidation of olefin. Therefore said catalyst is very useful in manufacturing olefin oxide commercially and very profitably.

What we claim is:

1. A method of manufacturing a silver catalyst for use in the vapour phase catalytic oxidation of olefin, which comprises forming a slurry with a volatile liquid inert to silver and a powder of active catalytic silver and a powder of electrolytic silver having a dendritic structure which has been deposited on a cathode in the electrolysis of silver nitrate solution, in a proportion of active catalytic silver powder to electrolytic silver within a range of from 10 to 50% by weight to dilute and disperse the powder of active silver into the powder of electrolytic silver, the size of powder of inactive electrolytic silver being within the range of −50+200 mesh, drying the slurry and press-molding the product thus obtained into granules; said catalytic silver powder being produced by reducing silver oxide obtained by reacting caustic alkali with silver salts.

2. A method of manufacturing a silver catalyst for use in the vapour phase catalytic oxidation of olefin, which comprises forming a slurry with a volatile liquid inert to silver and a powder of active catalytic silver and a powder of electrolytic silver having a dendritic structure which has been deposited on a cathode in the electrolysis of silver nitrate solution, in a proportion of active catalytic silver powder to electrolytic silver within a range of from 10 to 50% by weight to dilute and disperse the powder of active silver into the powder of electrolytic silver, the size of powder of inactive electrolytic silver being within the range of −50+200 mesh, drying the slurry and press-molding the product thus obtained into granules; said catalytic silver powder being produced by pyrolysis of silver salts.

3. A method as claimed in claim 1 wherein said volatile liquid is acetone.

4. A method as claimed in claim 2 wherein said volatile liquid is acetone.

References Cited in the file of this patent
UNITED STATES PATENTS

| | | |
|---|---|---|
| 1,888,066 | Bond | Nov. 15, 1932 |
| 1,937,381 | Bond et al. | Nov. 28, 1933 |
| 1,998,878 | Lefort | Apr. 23, 1935 |
| 2,307,421 | Overhoff | Jan. 5, 1943 |
| 2,585,479 | Levy | Feb. 12, 1952 |
| 2,585,483 | Mawer | Feb. 12, 1952 |
| 2,773,844 | Carlson et al. | Dec. 11, 1956 |